US006932928B2

(12) United States Patent
Strümpler et al.

(10) Patent No.: US 6,932,928 B2
(45) Date of Patent: Aug. 23, 2005

(54) METHOD OF PRODUCING A PTC-RESISTOR DEVICE

(75) Inventors: Ralf Strümpler, Gebenstorf (CH); Ruzica Loitzl-Jelenic, Kirchdorf (CH); Joachim Glatz-Reichenbach, Tägerwilen (CH)

(73) Assignee: ABB Research Ltd., Zurich (CH)

( * ) Notice: Subject to any disclaimer, the term of this patent is extended or adjusted under 35 U.S.C. 154(b) by 139 days.

(21) Appl. No.: 10/311,006

(22) PCT Filed: Apr. 24, 2001

(86) PCT No.: PCT/CH01/00256

§ 371 (c)(1), (2), (4) Date: Dec. 12, 2002

(87) PCT Pub. No.: WO01/99126

PCT Pub. Date: Dec. 27, 2001

(65) Prior Publication Data

US 2003/0154591 A1 Aug. 21, 2003

(30) Foreign Application Priority Data

Jun. 19, 2000 (EP) ........................................... 00810535

(51) Int. Cl.$^{7}$ .......................... B29C 45/16; B29C 70/82

(52) U.S. Cl. ........................ 264/104; 264/255; 264/259; 264/328.8; 338/20

(58) Field of Search ................................ 264/104, 105, 264/250, 254, 255, 259, 271.1, 272.11, 272.15, 328.8; 29/610.1, 620; 338/20, 21, 22 R

(56) References Cited

U.S. PATENT DOCUMENTS

| | | | | | |
|---|---|---|---|---|---|
| 3,351,882 | A | * | 11/1967 | Kohler et al. | 338/322 |
| 4,724,417 | A | * | 2/1988 | Au et al. | 338/22 R |
| 4,780,598 | A | * | 10/1988 | Fahey et al. | 219/511 |
| 4,951,382 | A | * | 8/1990 | Jacobs et al. | 29/611 |
| 4,981,633 | A | * | 1/1991 | Alles et al. | 264/616 |
| 5,858,533 | A | | 1/1999 | Greuter et al. | |
| 5,861,795 | A | * | 1/1999 | Glatz-Reichenbach et al. | 338/22 R |
| 5,990,778 | A | * | 11/1999 | Strumpler et al. | 338/20 |
| 6,259,349 | B1 | * | 7/2001 | Strumpler et al. | 338/22 R |
| 6,429,766 | B1 | * | 8/2002 | Glatz-Reichenbach et al. | 338/22 R |
| 6,711,807 | B2 | * | 3/2004 | Duggal et al. | 29/614 |

FOREIGN PATENT DOCUMENTS

| | | | |
|---|---|---|---|
| CH | 19727345 | A1 | 10/1998 |

* cited by examiner

*Primary Examiner*—Angela Ortiz
(74) *Attorney, Agent, or Firm*—Burns, Doane, Swecker & Mathis, PC

(57) ABSTRACT

The invention relates to a novel method of producing a resistor device comprising a PTC-polymer element 2 and a varistor element 4. Both elements are molded in a common molding process using one common mold. Preferred is co-injection molding. The invention further relates to the resistor device thus produced and a current limit means including the resistor device and a switch (FIG. 4).

15 Claims, 2 Drawing Sheets

METHOD OF PRODUCING A PTC-RESISTOR DEVICE

BACKGROUND OF THE INVENTION

1. Field of the Invention

Figure 1:
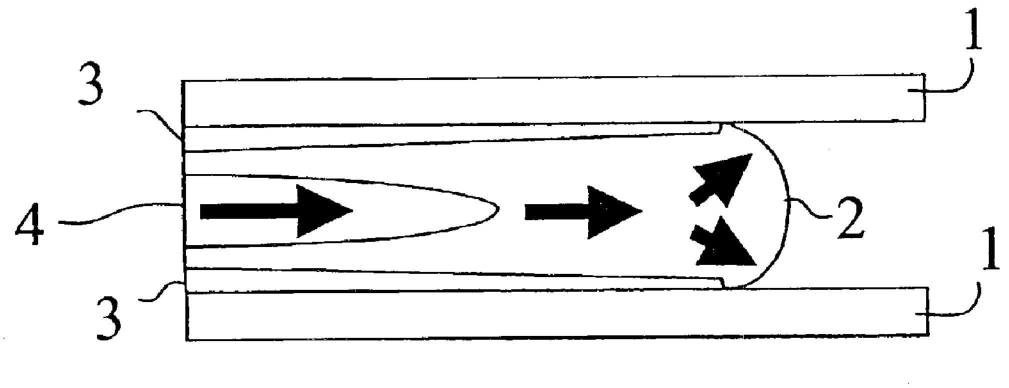

The present invention relates to a method of producing a resistor device comprising a PTC-polymer element.

2. Prior Art

It is well known in the prior art to include PTC-polymer elements in varistor devices. These PTC-polymer elements have a current limiting function as a consequence of the fact that their electrical resistances sharply increases when the current they are carrying exceeds a certain threshold value.

It is known, in order to avoid local overheating, to use varistors or resistors attached to a PTC-polymer element or mixed as a second filler material into the polymer matrix of the PTC-material. In each case, the varistor material shall electrically be in a parallel connection to the PTC-polymer material, at least in part.

SUMMARY OF THE INVENTION

The problem underlying this invention is to improve a resistor device comprising a PTC-polymer element and a varistor element in view of the electrical co-operation between these elements. The invention relates to a method of producing a resistor device, said resistor device comprising a PTC-polymer element and a varistor element, said PTC-polymer element and said varistor element being, at least in part, electrically parallel to each other, said method being characterised in that, said PTC-polymer element and said varistor element are fabricated by moulding PTC-polymer material and varistor polymer material during one common moulding process into one common mould.

Further, the invention relates to a resistor device produced by means of said method. Finally, the invention relates to a device for protecting an electrical circuit from overcurrent and short circuit current comprising a switch and said resistor device being electrically in series with said switch.

The basic idea of the invention is to produce a PTC-polymer element and a varistor polymer element in a common moulding process in which one common mould is used. Incidentally, moulding as used in this description includes any technology for forming polymer elements by introducing polymer material in a more or less fluid form into a mould. A preferred choice is common injection moulding of the PTC-polymer element and the varistor polymer element, i.e. co-injection. This will be explained later. However, also casting is a possible moulding technology.

By means of said common moulding process, it is possible to provide for a very good interface contact between the PTC-polymer element and the varistor polymer element. This interface quality is relevant for the quality of the electrical contact between these elements. A good electrical contact is important along the complete length of contact in order to avoid hot spot formation and damages within the PTC-polymer element. Such problems can result from local high resistance points between the PTC-polymer element and the varistor polymer element because a tripping action of the PTC-material would lead to dissipation of substantial amounts of energy within the PTC-material at these points. Using the invention, however, clean and fresh surfaces are used for interface formation optimising the electrical contact therebetween.

According to a preferred embodiment of the invention, first said PTC-polymer material is introduced into the common mould. Part of the PTC-polymer material is cooled down within the mould. According to this preferred embodiment, however, at least a part of the surface of the PTC-polymer material remains in a fluid state wherein "fluid" includes "viscous". Other parts of the PTC-polymer material, especially those near the cavity walls of the mould, are more viscous or even hardened and thus more or less remain where they are during the rest of the process. Then, the varistor polymer material is introduced into the mould, contacts a still fluid surface of the PTC-polymer material and thus produces a high quality interface. In this step, it might occur that the varistor material as a second material pushes more fluid parts of the PTC-polymer material and moves them to other regions of the mould.

This leads to a resistor device in which the PTC-polymer element, at least in part, lies at the outside and includes the varistor material in it. This is especially advantageous if the PTC-polymer material is also at the outside in the regions where the contacts shall be made so that the contact areas need not be worked afterwards to reach the PTC-polymer material. However, it is also possible to use the varistor material as a first material and the PTC-polymer material as a second material. The advantage is that the outside lying varistor material provides for a passivation layer. This inhibits arcing on PTC-polymer surfaces. In the other case, such arcing can be inhibited by using an insulating layer on top. Incidentally, such insulating material or other additional material could also be included in the described process within the meaning of this description and the appended claims. Especially, the terms "first material" and "second material" relate to the order of the materials discussed here and need not be understood in an absolute sense.

In both above discussed cases it is possible to use the first material (PTC-polymer material in the first case and varistor polymer material in the second case) in a further step as a third material. These can be advantageous to reach a full inclusion of the second material within the first and third material and/or for providing contact areas in the first case.

The fact that at least a part of the surface of the first material is still fluid when introducing the second material leads to shear occurring between both materials. Thereby, the interface quality can be much improved. An additional advantage of the very intimate contact between the PTC-polymer element and the varistor polymer element, and at least partial enclosure therebetween lies in the fact that the varistor polymer element maintains a better stability during tripping action and thus mechanically stabilizes the resistor device.

Preferably, in the method according to the invention, air contact of the polymer materials is reduced. Especially, during the above described moulding process, during introduction of the second material, air contact should substantially be inhibited. Thereby, the interface quality can be optimised. E.g., many polymer materials including a filler material tend to produce a polymer enriched surface when contacting air, which has commonly a lower temperature. Also, crystallisation and passivation effects can be important. The above shear effect improves these problems with special interface effects.

A preferred moulding technology, as stated above, is co-injection moulding. With this technology, it is easy to minimise air contact. Further, with injection moulding, a faster and economical mass production can be achieved. In comparison, casting processes, also under vacuum or inert atmosphere, are slow, however possible.

As a further preferred choice, metal contact elements of the resistor device can be inserted into the PTC-polymer material during that moulding step. Here, "during" means within the period of residual fluidity of the material. This does not necessarily imply that the metal contact elements are inserted under air exclusion or within the mould. As metal contact elements, also metal foils can be advantageous which can be pressed on surfaces of the PTC-polymer material.

Other preferred features of the invention relate to the geometry of the resistor device. First, it is preferred that the PTC-polymer element has a constriction of the cross-sectional area that is effective for current flow. Such a constriction defines the area of tripping of the PTC-polymer element. This can be important for several details of the layout of the resistor device. Especially, it should be avoided that the tripping action occurs in the vicinity of the metal contact elements.

It is preferred that this constriction is given by a (full aperture) angle of the constriction of at least 100°, preferably higher values of 105°, 110°, 115° or 120°. This total angle is to be regarded as a sum of a right-hand aperture angle and a left-hand aperture angle, having their respective apex points separated from each other. These apex points are located at the right and left side respectively of the constriction and need not be identical. For definition of the angles a linear segment can be defined as a mean value, when the actual forms are not regular. Further, this aperture angle should be present at least for one longitudinal sectional plane through the constriction including the main current direction. However, also other longitudinal sectional planes including the main current direction can show aperture angles, not necessarily above the given values.

Additionally, it is preferred, that the constriction has the form of a web with minimum cross-sectional area, that web extending in the main current direction over a distance of at least 5 mm. More preferred values are 7, 10, 15 or even 20 mm, depending on the voltages to be withstand.

Further, it is preferred to use resistor devices with two or more electrically parallel constrictions or webs. Thereby, the current carrying capability can be improved while simultaneously maintaining an efficient cooling of the web.

The contact resistance between the metal contact elements and the PTC-polymer material can be improved by using the complete contact area of the metal contact elements with the PTC-polymer material, i.e. avoiding contacts to the varistor polymer material that is of higher resistance compared to the normal conducting state of the PTC-material.

As regards the materials, the polymer matrix at least of the PTC polymer material is preferably a thermoplastic material, most preferably high density polyethylene.

Preferred quantitative ranges for the inclusion of the conductive filler material inherent to PTC polymer materials are 20–60 Vol.-%, more preferably 30–55 Vol.-% and even more preferably 43–50 Vol.-% (with respect to the total volume of the PTC polymer material). A preferred choice for this conductive filler material is $TiB_2$.

This filler material is included in powder form dispersed in the polymer matrix. It should be of metallic conductivity, i.e. should have a specific resistance of $10^{-3}$ Ωcm, at most. This excludes e.g. carbon black. The above mentioned thermoplastic polymer matrix is preferably comprised in an amount of 40–80 Vol.-% and more preferably of 45–70 Vol.-%.

The above specified PTC polymer material shows, at a predetermined voltage, a zone of high resistance ("hot zone"). The length of this hot zone, together with the dielectric strength of the material in the hot state, determines the magnitude of the voltage held by the resistor in the high-impedance state. According to the invention, the voltage locally occurring at the hot zone can be discharged by the varistor. In this case, it is of particular advantage that, on the account of the intimate contacting of varistor and PTC material, the varistor has a lower break-down voltage over small distances than over its complete length. When the voltage occurring at the hot zone exceeds the local break-down voltage of the varistor, the current is locally commutated to the varistor material, which serves as a by-pass. As a consequence, current is still flowing through the rest of the PTC material, which is still relatively cold. Hence, a next hot zone occurs and the same mechanism happens at another part of the resistor. This repeats until a long part of the PTC material is in the hot state. The length is either limited by the length of the constriction or by the applied voltage.

A preferred application of a resistor device according to the invention is in the area of switches used to interrupt impermissible currents. By a series connection of a switch and the resistor device according to the invention, the current interrupting capability of switch can effectively be improved. This is a consequence of the fact that the resistor device is able to limit the current before or during the switching action.

DESCRIPTION OF PREFERRED EMBODIMENTS

Figure 2:
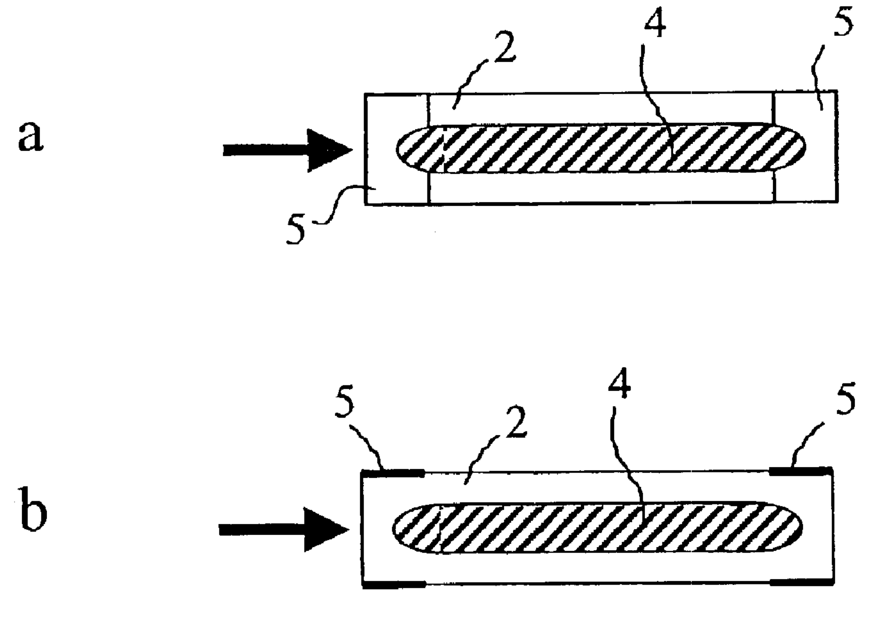
Figure 3:
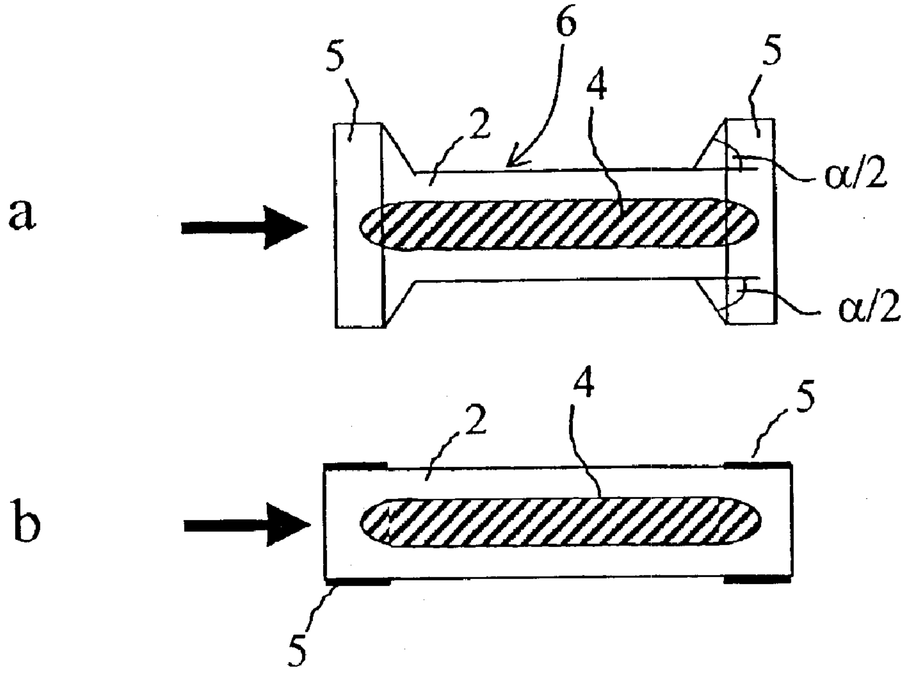
Figure 4:
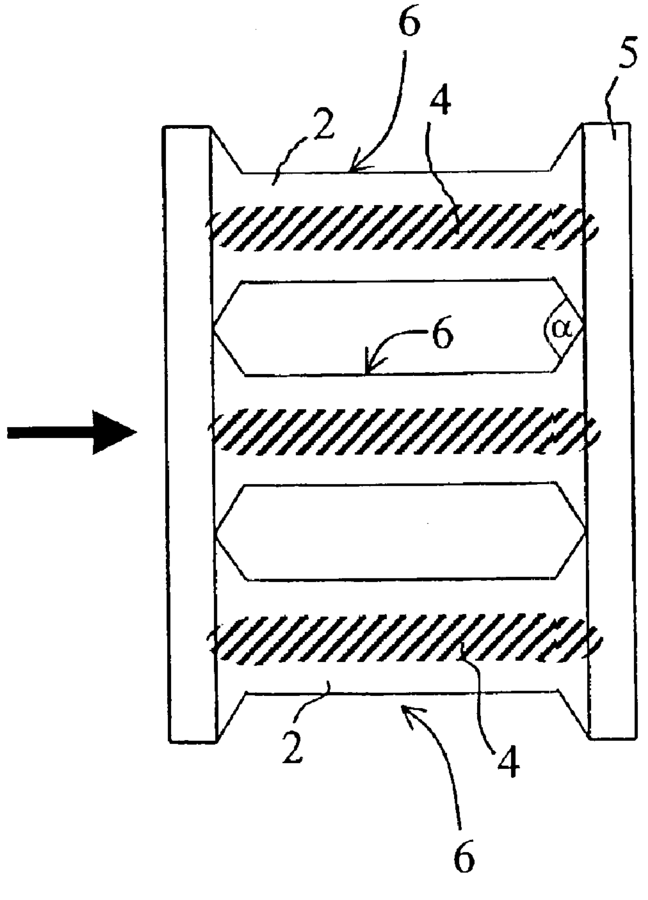

In the following, preferred embodiments of the invention will be described with reference to the drawings in which FIG. 1 is a diagrammatical cross-section through an injection mould during an injection mould process according to the invention;

FIG. 2*a* is a schematic cross-sectional view of a resistor device according to a first embodiment of the invention;

FIG. 2*b* is a view as in FIG. 2*a* but in different perspective;

FIG. 3*a* is a schematic cross-sectional view of a resistor device according to a second embodiment of the invention;

FIG. 3*b* is a view as in FIG. 3*a* but in different perspective;

FIG. 4 is a schematic cross-sectional view of a resistor device according to a third embodiment of the invention.

FIG. 1 is a diagram explaining the main principle of the invention. An injection mould is referenced by numeral 1 and symbolized by two cavity walls. It is clear that actual moulds can have much more complicated forms. The details of injection moulding technology need not be explained here and are known to the skilled person.

From a left side in FIG. 1, polymer material is introduced, as shown by the arrow, FIG. 1 shows a state in which a first material, a PTC-polymer material 2 had been injected earlier and has built-up a somewhat hardened peripheral layer near the walls of mould 1. This peripheral layer is referenced by numeral 3. Those parts of PTC-polymer material 2 that are not yet solidified and still fluid are followed by an (according to FIG. 1 presently) injected second material, a varistor polymer material 4. This varistor polymer material 4 pushes the fluid part of the PTC-polymer material through mould 1. Thereby, a structure is built-up in which a PTC-polymer peripheral layer includes a varistor polymer core. This is achieved by the illustrated co-injection moulding process with a common mould. Further, in this embodiment, also a common nozzle is used for both materials wherein it can be switched between two conduits leading to this nozzle.

In a further step, not illustrated in FIG. 1, PTC-material 2 can be injected once more leading to a complete inclusion of varistor polymer core 4 within PTC-polymer material 2, core 4 having a cigar-like form. The main current direction corresponds to the injection direction, i.e. is horizontal in the figures.

FIGS. 2*a* and 2*b* show one embodiment of a resistor device according to the invention. This resistor device includes a core 4 of varistor polymer material surrounded by a peripheral layer 2 of PTC-polymer material. FIGS. 2*a* and 2*b* show cross-sectional views in which the main current direction of the resistor device corresponds to the horizontal direction. Accordingly, varistor core 4 extends in the horizontal direction. The arrow at the left side in FIGS. 2*a* and 2*b* shows the direction of injection moulding which is the same as in FIG. 1. FIG. 2*b* shows a similar cross-sectional view, however with a orthogonal perspective compared to FIG. 2*a*. Therefore, contacts 5 are shown in cross-section in FIG. 2*b*. Their position and extension is symbolised in FIG. 2*a*, too, although they are not really included in the cross-section but lying above and below the cross-section. These contact elements are metal foil elements that can be pressed on the PTC-polymer material 2 immediately after a co-injection mould process when the PTC-polymer material is still somewhat fluid. It is also possible, to apply heat in order to fix the metal contact element 5 on the PTC-polymer material 2.

Comparing FIGS. 2*a* and 2*b* to FIG. 1 shows that a third injection moulding step with PTC-polymer material 2 has let to a complete enclosure of varistor polymer material 4 therein. Thus, the contacts can be applied on the mere PTC-polymer material 2 having, in its normal conducting state, a lower resistance. This applies also to the case in which the metal contact elements are fixed at (in FIGS. 2*a* and 2*b*) left and right side faces of the resistor device (not shown).

FIGS. 2*a* and 2*b* could also be interpreted to the case in which a PTC-polymer core is enclosed in a varistor polymer enclosure. In this case, in order to have contacts to the PTC-polymer core, one would have to cut the resistor device e.g. at the positions of the inner ends of the metal contact elements 5.

FIGS. 3*a* and 3*b* show a second embodiment that is in principle similar to the first embodiment in FIGS. 2*a* and 2*b*. For corresponding elements the same reference numerals are used. The difference to FIGS. 2*a* and 2*b* resides in broadening of the PTC-polymer element 2 in one dimension, as can be seen in FIG. 3*a*. This structure leads to increased areas of contact to the metal contact elements 5 and defines a web 6 of minimum cross-sectional area between the two peripheral broadened regions. The length of web 6 can be longer than 20 mm, depending on the voltage withstand capability to be achieved. FIG. 3*a* also shows aperture angle $\alpha$ consisting of a upper and a lower half aperture angle $\alpha/2$. The aperture angle is 120°, actually.

FIG. 4 shows a third embodiment, again similar to the first and second embodiments shown in FIGS. 2*a*–3*b*. Again, similar elements are referenced by the same numerals. This embodiment corresponds to the second embodiment with the exception that, here, three webs 6 have been chosen sharing common contact elements 5. The perspective of FIG. 4 corresponds to FIG. 3*a*. The orthogonal perspective looks as in FIG. 3*b* besides the metal contact elements 5 being somewhat less broad. This third embodiment provides the advantage of increasing the minimum cross-sectional area and thus the current carrying capability without weakening cooling of the tripping zone of the PTC-polymer element.

What is claimed is:

1. A method of producing a resistor device, said resistor device comprising a PTC-polymer element and a varistor element, said PTC-polymer element and said varistor element being, at least in part, electrically parallel to each other, wherein said PTC-polymer element and said varistor element are fabricated by molding PTC-polymer material and varistor polymer material during one common molding process into one common mold, and wherein, during the molding process, a first one of the PTC-polymer material and the varistor polymer material is introduced into the mold as a first material and is cooled down by the mold to increase its viscosity, and the second one of the PCT-polymer material and the varistor polymer material is introduced into the mold as a second material to contact a still fluid surface of the first one of the PTC-polymer material and the varistor polymer material.

2. A method according to claim 1, wherein, after said second material has cooled down to increase its viscosity, third, said first material is introduced once more into said mold to contact a still fluid surface of said second material.

3. A method according to claim 1, wherein said molding process of said two or three materials is done without substantial air contact of said second material.

4. A method according to claim 1, wherein said molding process is a co-injection molding process.

5. A method according to claim 1, wherein metal contact elements are inserted into said PTC-polymer material during said molding process.

6. A method according to claim 1, wherein said PTC-polymer element includes a constriction of the effective current carrying area perpendicular to a main current direction of said resistor device.

7. A method according to claim 6, wherein an aperture angle ($\alpha$) of said constriction in a longitudinal sectional plane containing said main current direction is at least 100°.

8. A method according to claim 6, wherein said constriction defines a web of minimum current carrying area, extending in said main current direction over at least 5 mm.

9. A method according to claim 6, wherein said resistor device comprises at least two constrictions of the effective current carrying area being electrically parallel to each other.

10. A method according to claim 1, wherein said resistor device, after fabrication, comprises metal contacts being in contact exclusively with said PTC-polymer material, not with said varistor polymer material.

11. A resistor device produced by a method according to claim 1.

12. A device for protecting an electrical circuit from overcurrent and short circuit current faults comprising a switch and a resistor device produced by a method according to claim 1 being electrically in series with said switch.

13. A method according to claim 6, wherein an aperture angle ($\alpha$) of said constriction in a longitudinal sectional plane containing said main current direction is at least 110°.

14. A method of producing a resistor device, said resistor device comprising a PTC-polymer element and a varistor element, said PTC-polymer element and said varistor element being, at least in part, electrically parallel to each other, wherein said PTC-polymer element and said varistor element are fabricated by molding PTC-polymer material and varistor polymer material during one common molding process into one common mold, wherein said PTC-polymer element includes a constriction of the effective current carrying area perpendicular to a main current direction of said resistor device;

wherein an aperture angle (α) of said constriction in a longitudinal sectional plane containing said main current direction is at least 100°.

15. A method of producing a resistor device, said resistor device comprising a PTC-polymer element and a varistor element, said PTC-polymer element and said varistor element being, at least in part, electrically parallel to each other, wherein said PTC-polymer element and said varistor element are fabricated by molding PTC-polymer material and varistor polymer material during one common molding process into one common mold, wherein said PTC-polymer element includes a constriction of the effective current carrying area perpendicular to a main current direction of said resistor device;

wherein said resistor device comprises at least two constrictions of the effective current carrying area being electrically parallel to each other.

* * * * *